(No Model.)

F. H. TUTTLE.
VEHICLE SPRING.

No. 263,253. Patented Aug. 22, 1882.

WITNESSES
Franck L. Durand
N. E. Oliphant

INVENTOR
Francis H. Tuttle,
per Chas. H. Fowler,
Attorney

UNITED STATES PATENT OFFICE.

FRANCIS H. TUTTLE, OF CLIFFORD, PENNSYLVANIA.

VEHICLE-SPRING.

SPECIFICATION forming part of Letters Patent No. 263,253, dated August 22, 1882.

Application filed July 17, 1882. (No model.)

*To all whom it may concern:*

Be it known that I, FRANCIS H. TUTTLE, a citizen of the United States, residing at Clifford, in the county of Susquehanna and State of Pennsylvania, have invented certain new and useful Improvements in Vehicle-Springs; and I do hereby declare that the following is a full, clear, and exact description of the same, reference being had to the annexed drawings, making a part of this specification, and to the letters and figures of reference marked thereon.

Figure 1:
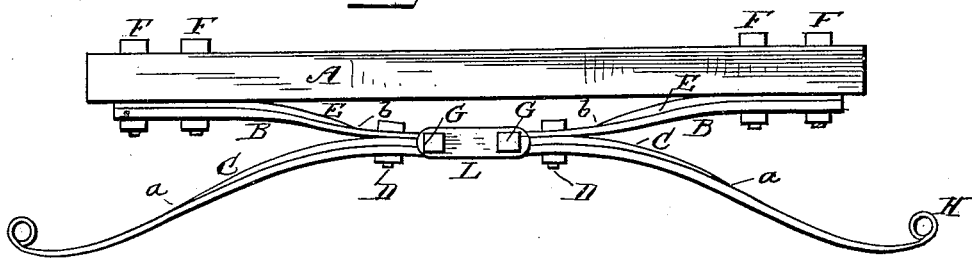
Figure 2:
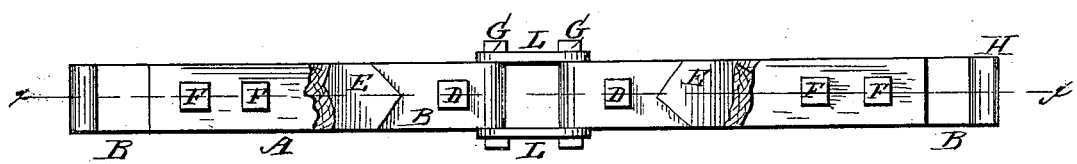
Figure 3:
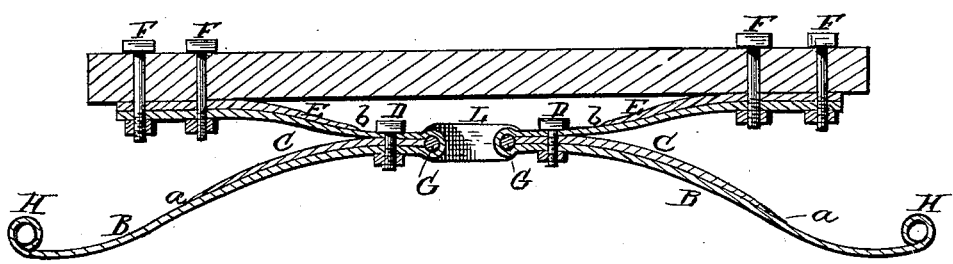

Figure 1 of the drawings is a side elevation of my invention; Fig. 2, a top plan view with the spring-bar partially broken away, and Fig. 3 a sectional view of the same.

This invention relates to certain new and useful improvements in vehicle-springs, and the object thereof is to produce such a spring as can be constructed of light spring-steel, to be firm in its action and durable in its use, allowing of a great amount of strain without becoming spread or weakened, while at the same time it presents a light and graceful appearance to the buggy or other vehicle upon which it is used and readily adjusts itself to unequal weights therein. This object I attain by the construction substantially as shown in the accompanying drawings and hereinafter described.

In the accompanying drawings, A represents the spring-bar of a vehicle, to which are suitably bolted springs composed of leaves B, formed of a light piece of spring-steel, bent in the manner illustrated, and having a leaf, C, of spring-steel, placed between the parts, said leaf following the curvature of the lower portion of the leaves B down to the points marked *a*, and the three leaves thus formed clamped firmly together by bolts D to prevent them from spreading, and at the same time render the spring more firm at the point of strain.

Between the upper portions of the leaves B and the spring-bar A is placed an equalizing-leaf, E, extending along the curvature of the leaves B to the points *b*, to equalize the strain upon the leaves C and aid in giving firmness to the spring at the point upon which the strain usually falls, and the said leaves B and E are secured to the spring-bar A by bolts F, the spring-bar being in turn bolted to the box-sills of the buggy or other vehicle.

The leaves are bent around bolts G of a shackle, and terminate in eyes H, by which they are attached to the side bars of a vehicle by means of the usual side-bar clips.

The shackle connecting the springs, formed in the manner above described, admits of the free action of the springs to adjust themselves to unequal weight in the vehicle, and the shackle only consisting of two plates, L, fitted to the springs by bolts, a degree of lightness is given to the said shackle, and at the same time the springs are prevented from becoming bound from the accumulations of dirt therein.

A vehicle-spring constructed after the manner described is at once strong and cheaply manufactured, light in weight, thoroughly self-adjusting to unequal weights in the vehicle, and cannot become spread or broken from ordinary wear and tear.

Having now fully described my invention, what I claim as new, and desire to secure by Letters Patent, is—

In a vehicle-spring, the leaves B, bent in the manner shown, and having the interposing leaves C E, the upper portions of the springs being connected to the spring-bar A by bolts F, in combination with the shackles, consisting of the plates L and bolts G and the bolts D, the latter passing through the springs after they have been bent around the bolts G, substantially as and for the purpose set forth.

In testimony that I claim the above I have hereunto subscribed my name in the presence of two witnesses.

FRANCIS H. TUTTLE.

Witnesses:
A. HUE COLBURN,
JOHN S. COURTRIGHT.